(12) United States Patent
Petersen

(10) Patent No.: US 12,395,438 B1
(45) Date of Patent: Aug. 19, 2025

(54) RELIABLE MULTICAST NETWORK COMMUNICATION

(71) Applicant: Ethernovia Inc., San Jose, CA (US)

(72) Inventor: Brian Arnold Petersen, San Francisco, CA (US)

(73) Assignee: Ethernovia Inc., San Jose, CA (US)

( * ) Notice: Subject to any disclaimer, the term of this patent is extended or adjusted under 35 U.S.C. 154(b) by 342 days.

(21) Appl. No.: 18/066,022

(22) Filed: Dec. 14, 2022

Related U.S. Application Data

(60) Provisional application No. 63/265,667, filed on Dec. 17, 2021.

(51) Int. Cl.
*H04L 47/10* (2022.01)
*H04L 1/08* (2006.01)
*H04L 47/34* (2022.01)

(52) U.S. Cl.
CPC .......... *H04L 47/15* (2013.01); *H04L 1/08* (2013.01); *H04L 47/34* (2013.01)

(58) Field of Classification Search
CPC ......... H04L 47/15; H04L 47/10; H04L 47/34; H04L 47/20; H04L 45/16; H04L 45/12; H04L 45/24; H04L 12/18; H04L 12/28; H04L 12/56; H04L 12/72; H04L 12/81; H04L 12/66; H04L 12/70; H04L 12/71; H04L 12/76; H04W 84/18; H04W 40/36; H04W 40/24; H04W 36/02; H04W 36/00
USPC ....................................................... 370/390
See application file for complete search history.

(56) References Cited

U.S. PATENT DOCUMENTS

| | | | | |
|---|---|---|---|---|
| 6,947,434 B2 * | 9/2005 | Hundscheidt | ........... | H04L 45/16 370/252 |
| 7,349,390 B2 * | 3/2008 | Igarashi | ................ | H04W 36/02 370/432 |
| 8,098,618 B2 * | 1/2012 | Hundscheidt | ........... | H04L 45/00 370/335 |
| 8,346,904 B2 * | 1/2013 | Mamillapalli | ...... | H04L 12/1868 709/204 |
| 9,451,417 B2 * | 9/2016 | Abraham | ................ | H04W 4/06 |
| 9,900,168 B2 * | 2/2018 | Sarkar | ................. | H04L 12/1877 |
| 9,992,034 B2 * | 6/2018 | Krause | ................ | H04L 12/1881 |
| 10,270,606 B2 * | 4/2019 | Thubert | .............. | H04L 12/1881 |
| 11,018,886 B1 * | 5/2021 | Wijnands | ............... | H04L 12/185 |
| 11,601,295 B2 * | 3/2023 | Kumar M R | ........... | H04L 67/60 |
| 12,081,357 B2 * | 9/2024 | Holmberg | ........... | H04L 12/1868 |
| 2020/0068528 A1 * | 2/2020 | Abraham | .......... | H04W 36/0007 |
| 2022/0217504 A1 * | 7/2022 | Inoue | .................... | H04L 5/0082 |

* cited by examiner

Primary Examiner — Man U Phan
(74) Attorney, Agent, or Firm — Schwegman, Lundberg & Woessner, P.A.

(57) ABSTRACT

Various embodiments provide for reliable multicast network communication using network connections. According to some embodiments, a source network node sends data to a plurality of destination network nodes (e.g., members of a multicast group of network nodes) over a communications network by one or more multicast data units, where the multicast data units include a sequence number and are sent using (e.g., transported over) one or more network connections.

20 Claims, 5 Drawing Sheets

RELIABLE MULTICAST NETWORK COMMUNICATION

CROSS-REFERENCE TO RELATED APPLICATION

This application claims priority to and the benefit of U.S. Provisional Patent Application No. 63/265,567, filed on Dec. 17, 2021, which is incorporated herein by reference.

TECHNICAL FIELD

Embodiments described herein relate to data communications and, more particularly, to systems, methods, devices, and instructions relating to reliable multicast network communication.

BACKGROUND

Data communications between network nodes of a communications network (e.g., network devices operating as nodes on the communications network) can be facilitated over reliable network connections, such as transport layer connections based on Transmission Control Protocol (TCP), and over unreliable network connections, such as transport layer connections based on User Datagram Protocol (UDP). A reliable connection can be relied upon to correctly deliver every data unit (e.g., data packet or data frame) it transports to network destinations of those respective data units. For example, if a data unit submitted to a reliable connection is lost, that loss can be detectable and the reliable network connection will reattempt transportation of the lost data unit (e.g., will cause the source network node to resend the lost data unit). In contrast, an unreliable connection cannot be relied upon to do the same-if a data unit submitted to an unreliable connection is lost (e.g., for any reason), that loss may or may not be detectable and the unreliable network connection will not reattempt transportation of the lost data unit (e.g., will not cause the source network node to resend the lost data unit).

Popular physical layer network technologies, such as Ethernet and Wi-Fi, can be inherently unreliable. For example, data units (e.g., packets) transmitted over Ethernet and Wi-Fi can be lost due to bit errors experienced during transmission or due to excessive queuing delays causing queues to reach their storage capacity (which results in further received data units being dropped). While the loss of these data units can be noted by an endpoint network node (e.g., source or destination network node) or by an intermediate network node (e.g., forwarding network node), there is no effort to re-send the lost data units and there is no effort to track which data units were lost by Ethernet and Wi-Fi network connections. Additionally, Internet Protocol version 4 (IPv4) and Internet Protocol version 6 (IPv6), which operates on top of various network technologies (such as Ethernet and Wi-Fi) to enable a series of separate networks to be assembled as a larger network, are also unreliable.

Accordingly, physical layer network technologies, such as Ethernet and Wi-Fi, often rely on such transport layer technologies as TCP to enable an inherently-unreliable underlying network technology (e.g., Ethernet or Wi-Fi networks) to provide reliable data unit transport services. In particular, TCP uses sequence numbers and acknowledgment data units (e.g., packets) to detect lost data units and to request their retransmission from their source network node. TCP enables a receiving network node to reassemble an original message by re-ordering the received data units (e.g., received packets) according to their sequence numbers, and discarding an unnecessary duplicated data units (e.g., a lost acknowledgment packet can cause a source network node to unnecessarily resend a successfully received packet). The InfiniBand protocol is another example of transport layer network technology that can provide reliable data unit transport services over unreliable underlying network technologies.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
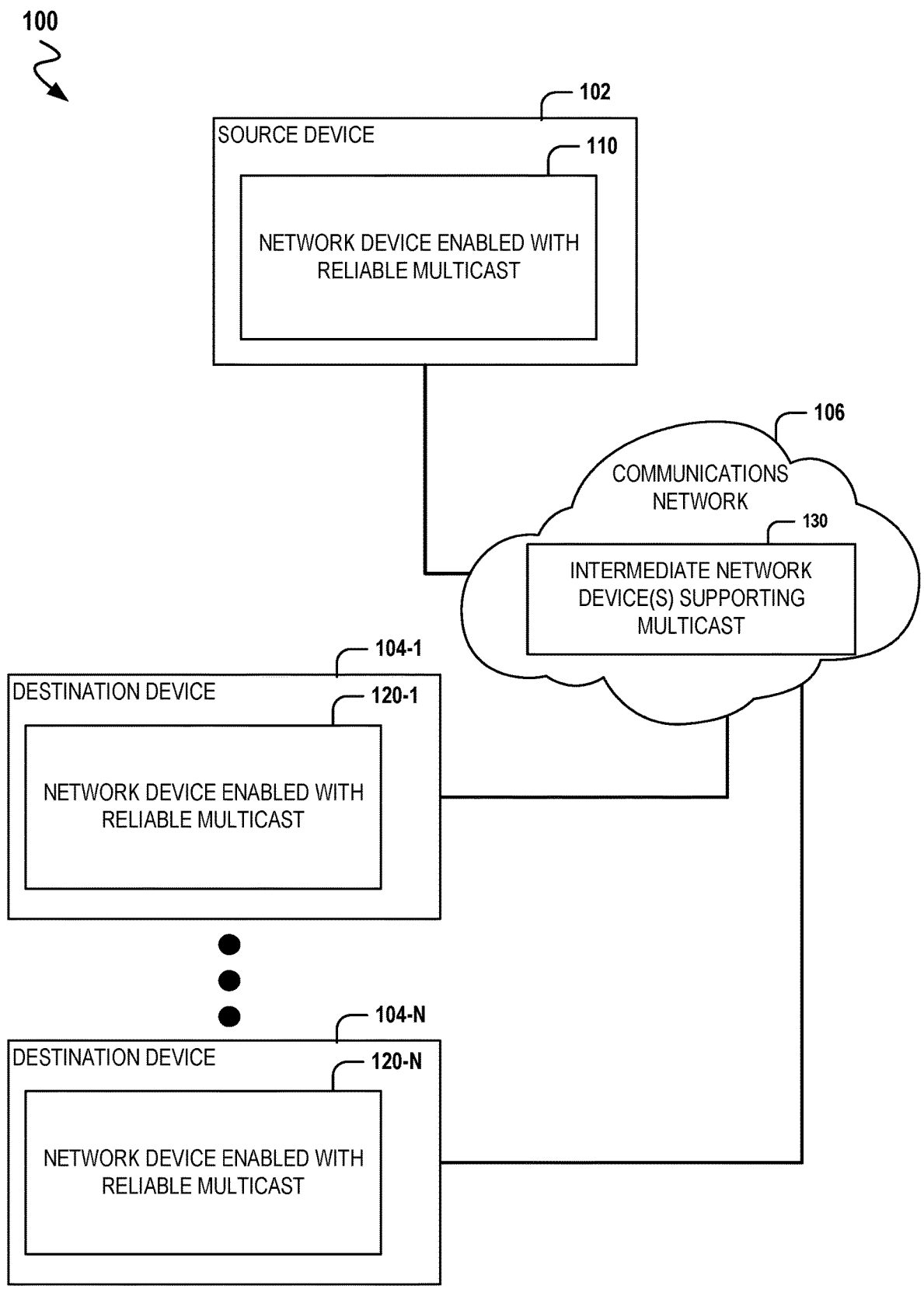
FIG. 1 is a block diagram illustrating an example system comprising a source device and destination devices that each include a network device enabled with reliable multicast data communication, in accordance with some embodiments.

Traditionally, reliable network connections, such as those based on TCP, have a weakness with respect to multicast data network communication. In particular, conventional network communications use reliable network connections for unicast network communications, where data units (e.g., packets) are sent from a single source network node to a single destination network node. In contrast, multicast network communications involves data units (e.g., packets) being sent from a single source network node to two or more destination network nodes over a communications network. Conventional multicast network communications relies on unreliable network connections, such as those based on UDP or based on unreliable connection types supported by Infini-Band. While reliable network connections can be used to emulate multicast data communication (e.g., by establishing a series of reliable unicast network connections-one per intended destination network node in the multicast group), this could impose a large burden (e.g., resource burden) on source network node, as the source network node has to generate all the copies of the data unit to be communicated to the multicast group, and has to transmit the individual copies to each destination network node in the multicast group.

Various embodiments provide for reliable multicast network communication using network connections, such as network connections based on TCP, reliable connection types supported by InfiniBand, and other network layer protocols. In particular, various embodiments facilitate multicast network communication by relying on a communication network (rather than the single source network node) to generate data unit copies to be delivered to destination network nodes (of the multicast group) during multicast data unit transfer. According to some embodiments, a single source network node of a communications network sends (e.g., transmits) a single multicast data unit (e.g., multicast packet) and various network nodes (e.g., forwarding network nodes, such as network bridges, switches, routers, or other network elements) of the communications network make copies of the single multicast data unit as needed to facilitate delivery of the single multicast data unit to each destination network node of the multicast group associated with the single multicast data unit.

According to some embodiments, a source network node sends (e.g., transmits) data to a plurality of destination network nodes (e.g., members of a multicast group of network nodes) over a communications network by one or more multicast data units, where the multicast data units are sent using (e.g., transported over) one or more network connections established using a network protocol (e.g., TCP or reliable connection types supported by InfiniBand) that supports transporting data units that include a sequence number. For example, a source network node can generate a sequence of multicast data units from the data to be sent, where each multicast data unit in the sequence comprises a multicast network address and a header portion that includes a sequence number (e.g., corresponding to its place in the sequence) in accordance with the network protocol, and where each of the plurality of destination network nodes is configured with the multicast network address (e.g., to enable their reception of the multicast data unit). Reliable multicast network communications using network connections, as described herein, can be used in place of conventional forms of multicast network communications, such as those that using unreliable network connections based on UDP or another network protocol that that does not support data unit sequence numbers.

For each individual multicast data unit in the sequence, the source network node of an embodiment can send (e.g., transmit) a single copy of the individual multicast data unit to the plurality of destination network nodes by sending (e.g., transmitting) a single copy of the individual multicast data unit to an intermediate network node over a network connection established between the source network node and the intermediate network node, where the intermediate network node is operatively coupled between the source network node and the plurality of destination network nodes. The intermediate network node can serve as a gateway (e.g., gateway network node) for the source network node to communicate data units (e.g., send and receive) with a network segment that includes the plurality of destination network nodes. Subsequently, the intermediate network node (e.g., operating as a forwarding network node) can receive the copy of the individual multicast data unit, and can send (e.g., transmit) the copy (or a modified version thereof) toward the plurality of destination network nodes (e.g., toward one or more network segments that contain/include the plurality of destination network nodes) using two or more network connections between the intermediate network node and the plurality of destination network nodes, thereby forwarding the individual multicast data units. One or more intermediate network nodes of the communications network can operatively couple the source network node to a given destination network node.

For various embodiments, the communications network between the source network node and the plurality of destination network nodes is configured for network-assisted multicast, where the communications network can make it possible for the source network node to send a multicast data unit to the plurality of destination network nodes through a single transmission. For instance, one or more of the intermediate network nodes can each be configured to replicate (e.g., generate a copy of) a received multicast data unit for each network connection that operatively couples the intermediate network node to a network segment containing at least one destination network node, and on which the multicast data unit is to be sent (e.g., forwarded) toward one or more of destination network nodes. In this way, the communications network comprising the one or more intermediate network nodes can be regarded as a multicast-capable communications network.

For some embodiments, the source network node is aware of the number of destination network nodes in the plurality of destination network nodes, and uses this number to facilitate the reliable multicasting of data units using network connections. For example, the source network node of an embodiment can occasionally (e.g., periodically, such as at a periodic interval of sequence numbers) include, in a multicast data unit the source network node sends (e.g., transmits) to the intermediate network node, a request for response, where the request is configured to cause each individual destination network node receiving the multicast data unit to generate and send (e.g., transmit) a data unit with a response (also referred to herein as a response data unit) that indicates all the data units that the individual destination network node has received since the previous response. For instance, a request for response can be included in the multicast data unit by the source network node setting a flag (e.g., flag bit) in the multicast data unit, and the response from the individual destination network node can comprise a data unit that includes an acknowledgment (ack) (e.g., an acknowledgement bit flag that is set). Hereafter, a data unit including a request for an acknowledgement response can be referred to as a acknowledge request data unit, and a data unit including an acknowledgement (ack) can be referred to as an acknowledgment data unit. Upon the source network node receiving a response data unit from an individual destination network node, the source network node can update its state for the individual destination network node based on the response data unit For example, the source network node can update the state to indicate that multicast data units include and prior to the acknowledged sequence number are no longer subject to retransmission for the individual destination network node.

According to some embodiments, where the source network node sends (e.g., transmits) to the intermediate network node a multicast data unit that includes a request for response, and there are k number of destination network nodes (in the plurality), the source network node monitors for k number of responses (e.g., k number of acknowledgement data units) from the destination network nodes (e.g., one from each destination network node). In response to the source network node receiving less than k number of responses (e.g., k number of acknowledgement data units), the source network node of an embodiment can "rewind" the sending (e.g., transmission) process back to the last time the source network node received k number of responses (in response to the last time the source network node sent a multicast data unit that includes a request for response) by resending multicast data units from the sequence of multicast data units starting from a sequence number that associated with the last time (e.g., the multicast data unit that follows the multicast data unit that includes a request for response). Depending on the embodiment, the source network node can expect the k number of responses to be received within a certain period (e.g., the source network node can check for whether less than k number of responses has been received at a certain time after the multicast data unit has been sent).

Accordingly, the "rewind" of the sending process by the source network node can result in one or more multicast data units being sent (e.g., transmitted) one or more subsequent times (e.g., a second time, or a third time) by the source network node. Additionally, the one or more resent multicast data units may be received by one or more of the destination network nodes that already received all the multicast data units correctly (e.g., destination network nodes that responded to all multicast data units with a request for response), and thus the one or more resent multicast data units would be redundant to those one or more destination network nodes. When a given destination network node receives a resent multicast data unit that is redundant (e.g., because the given destination network node already received all the multicast data units correctly), the given destination network node can determine that the resent multicast data unit is redundant based on a sequence number included by the resent multicast data unit (e.g., determining that the sequence number of the resent multicast data unit matches the sequence number of a multicast data unit already received by the given destination network node).

According to some embodiments, in response to receiving a multicast data unit from the source network node, a destination network node is capable of sending a data unit in response to the multicast data unit (e.g., send an acknowledgement data unit) without the multicast data unit comprising a request for response (e.g., a request for acknowledgement). Additionally, for some embodiments, a destination network node is capable of detecting a missing multicast data unit from multicast data units the destination network node has already received based on sequence numbers of those multicast data units. In response to detecting a missing data unit, a destination network node can send (e.g., transmit) a data unit that comprises a negative acknowledgement (nack) and a sequence number associated with the missing data unit (e.g., sequence number of a data unit that precedes the missing data unit). The destination network node can detect the missing data unit based on analyzing the sequence numbers of the plurality of multicast data units the destination network node has already received, and determining (e.g., identifying) a gap in the sequence of numbers. Hereafter, a data unit including a negative acknowledgement (nack) can be referred to as a negative acknowledgment data unit. Additionally, or alternatively, in response to the destination network node detecting that it has not received a further data unit after a certain period of time (e.g., excessive period of time that is predetermined), the destination network node can send (e.g., transmit) a data unit that comprises a negative acknowledgement (nack) and a specific sequence number associated with the expect further data units. For instance, the specific sequence number can be for the next (further) multicast data unit the destination network node is expecting to receive from the source network device, or the specific sequence number can be for the last multicast data unit the destination network node received successfully without a gap in the sequence. In response to receiving a negative acknowledgment data unit that includes a sequence number from a destination network node, the source network node of an embodiment can "rewind" the sending process back to the sequence number and start resending (e.g., retransmitting) multicast data units from that point in the sequence of multicast data units (e.g., from the sequence of multicast data units starting from the sequence number). Similar to when the "rewind" of the sending process performed by the source network node in response to a missing acknowledgement data unit, the "rewind" of the sending process performed by the source network node in response to receiving a negative acknowledgement data unit can result in one or more destination network nodes receiving redundant multicast data units.

Redundant data units (generated by the "rewind" of the sending process) can cause issues when the data unit loss rate exceeds a burst replication count of the communications network. The burst replication count can comprise the product of the number of copies that must be made to reach all of the intended multicast destination network nodes and the number of data units transmitted by the source network node between acknowledgement request data units. For example, a replication count of 25 and a distance between acknowledgement request data units of 15 data units yields a burst replication count of 375. If the data unit loss rate exceeds one packet out of every 375, the source network node may not be able to make progress. Accordingly, for some embodiments, the source network node is configured to detect when data unit loss rate (e.g., packet loss rate) exceeds a burst replication count of the communications network, and adjusts (e.g., reduces) the distance between requests for acknowledgement data units (e.g., adjusts the interval at which requests for acknowledgement data units are sent). For example, the source network node can detect when data unit loss rate (e.g., packet loss rate) exceeds a burst replication count of the communications network by counting the number of retries the source network node performs with respect to data units (e.g., during a "rewind" of the sending process).

As used herein, a data unit can comprise a data packet (or packet) or a data frame, either of which can be defined in accordance with a network standard or protocol (e.g., defined by IEEE network standard, such as Ethernet). A data unit can be divided into a header portion that comprises header data, and a non-header portion (e.g., body or payload portion) that comprises non-header data, such payload data.

As used herein, a multicast data unit can comprise a data unit that is configured to be delivered to multiple destination network nodes that are members of a multicast group. For instance, a multicast data unit can be configured with a multicast network address associated with (e.g., that identifies) a multicast group, and each member node of the multicast group can be configured to receive and accept any multicast data unit that includes a multicast network address.

As used herein, a network device can comprise, for example, a multi-layer network device, such as a network adapter of a computing device. A network device can form part of a larger device, such as a desktop computer, a laptop computer, a smart phone, computing equipment within vehicles, and the other types of computing devices).

As used herein, a node (or network node) can comprise a network device operatively coupled to a communications network and operating as a node of the communications network. A source network node can be a network node on the communications network from which a data unit originates, and a destination network node can be a network node on the communications network that represents a final destination for a data unit. An intermediate network node can be a node on the communications network that is operatively coupled between a source network node of the communications network and a destination network node of the communications network. A forwarding network node can be a node on the communications network that is configured to receive a data unit via a first hardware network port and transmit (e.g., retransmit) the data unit (or a modified version thereof) via a second hardware network port toward at least one destination network node (e.g., toward a network segment that contains/includes at least one destination network node), thereby forwarding the data unit through the node and on to the at least one destination network node. Accordingly, an intermediate network node can serve as a forwarding network node within a communications network. Examples of forwarding nodes can include, without limitation, a network switch, a network bridge, a network router, or the like.

As used herein, a reliable network connection comprises a network connection between at least two end-point network devices based on a network protocol that supports transportation of a data unit (e.g., data packet or data frame) that includes a sequence number. Such a network protocol can ensure that data units are correctly delivered/transported to the intended network destination(s). For instance, a reliable network connection can ensure that a data unit includes a sequence number such that if it is lost, during transportation from a source network node to a destination network node, the data unit is resent (e.g., retransmitted) by the source network node until the data unit reaches the destination network node. Example network protocols that can be used to establish a reliable network connection can include, without limitation, TCP and reliable connection types supported by InfiniBand. A reliable network connection can be established using a network protocol (e.g., of a particular layer of the network) that supports sequence numbers with respect to data units generated and sent according to the network protocol. A sequence number of a given data unit can comprise a value that is included in a header portion of the data unit (e.g., packet's header) that indicates where the data unit belongs in a sequence of data units. For example, within the sequence of data units, the sequential number of a given data unit can be equal to the sequential number of a preceding data unit incremented by some value, such by a value of one, a value associated with a data unit metric (e.g., a value representing a data unit's length), or some other value that indicates where the next data unit belongs in the overall sequence of data units. For example, the reliable connection types supported by InfiniBand can use fixed-length packets (except for possibly a message's last packet) and increments its sequence number by one.

By use of various embodiments described herein, a communications network, such as an Ethernet-based network or a Wi-Fi-based network, can facilitate multicast data communications from a single sending network node, to a plurality of destination network nodes, using one or more network connections without overburdening the single sending network node. For instance, various embodiments can facilitate multicast communications using reliable connections without overburdening a single sending network node with maintaining a reliable network connection to each multicast receiving network node, or with generating a copy of each multicast data unit for each multicast receiving network node.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram illustrating an example system 100 comprising a source device 102 and destination devices 104-1 through 104-N (collective referred to herein as destination devices 104) that each include a network device enabled with reliable multicast data communication, in accordance with some embodiments. Depending on the embodiment, the source device 102 can be implemented (at least in part) by machine 500 of FIG. 5, and each of the destination devices 104 can be implemented (at least in part) by machine 500 of FIG. 5. As shown, the source device 102 comprises a network device enabled with reliable multicast data communication 110 (hereafter, the network device 110), which can operate as a source network device during multicast data communications as described herein. Destination devices 104-1 through 104-N respectively comprise network devices enabled with reliable multicast data communication 120-1 through 120-N (collective referred to herein as network devices 120), each of which can operate as a destination network device during multicast data communications as described herein.

The source device 102 and the destination devices 104 are designated as source and destination merely for illustrative purposes. It will be understood that in different contexts, the network device 110 of the source device 102 can be configured to operate as a destination network device, and any of the network devices 120 of the destination devices 104 can be configured to operate as a source network device.

A communications network 106 operatively couples the network device 110 of the source device 102 to the network devices 120 of the destination devices. The network device 110 and each of the network devices 120 can operate as nodes on the communications network 106. The communications network 106 can be implemented using a variety of network technologies, which can include different layers of network technology such, as Ethernet, Wi-Fi, TCP, Infiniband, Internet Protocol (IP), and the like. As shown, the communications network 106 one or more intermediate network devices 130 operatively coupled between the network device 110 of the source device 102 and the network devices 120 of the destination devices 104. According to some embodiments, at least one of the one or more intermediate network devices 130 operatively couples between the network device 110 of the source device 102 and at least one of the network devices 120 of the destination devices 104. For some embodiments, at least one of the intermediate network devices 130 operates a forwarding network device capable for receiving and forwarding multicast data units. Similarly, each of the network devices 120 of the destination devices 104 establishes a network connection (e.g., a network connection based on TCP) with at least one of the intermediate network devices 130 to facilitate receiving of multicast data units generated by the network device 110 of the source network device 102.

Each of the network devices 110, 120 can represent a multi-layer network device that implements features or methodologies described herein with respect to various embodiments. For instance, depending on the embodiment, the features or methodologies described herein can be implemented at the transport layer, the network layer, or the data link layer of the network devices 110, 120.

Figure 2:
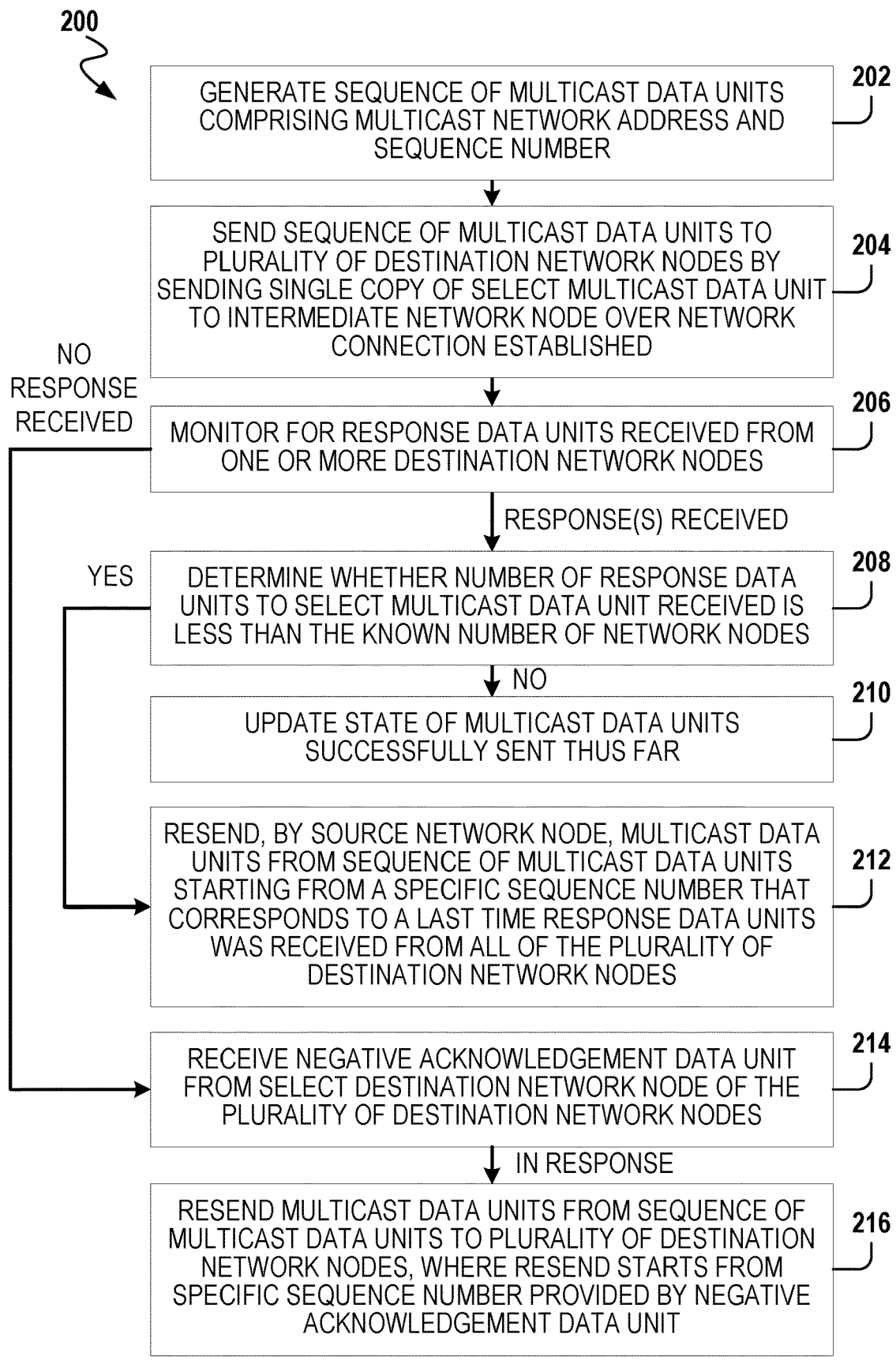
FIGS. 2 and 3 are flowcharts illustrating example methods for reliable multicast data communication using network connections, in accordance with some embodiments.
Figure 3:
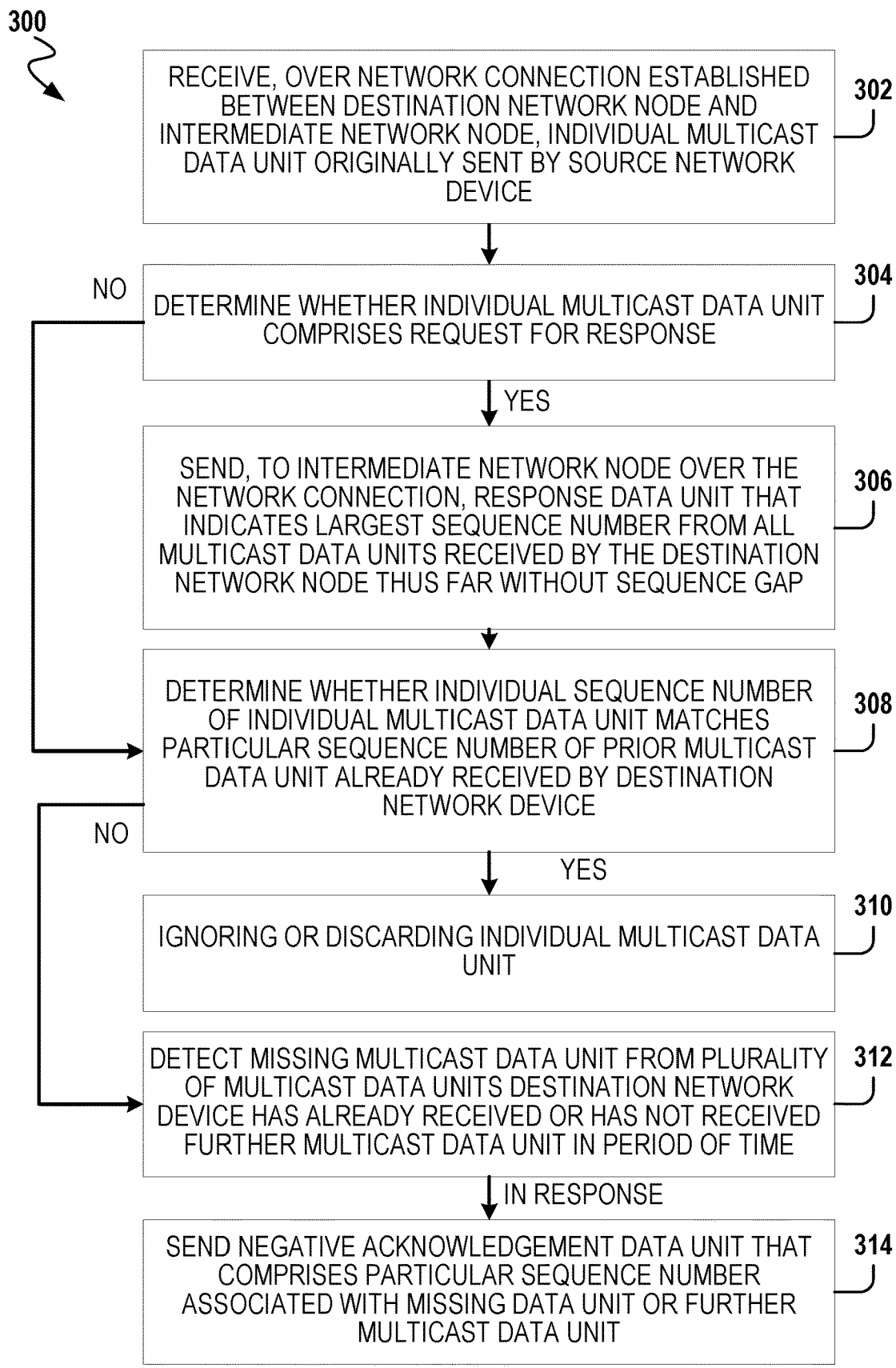

FIGS. 2 and 3 are flowcharts illustrating example methods 200, 300 for reliable multicast data communication using network connections, in accordance with some embodiments. It will be understood that example methods described herein may be performed by various components (e.g., circuit components). For instance, the methods 200, 300 may be performed by any one of the network devices 110, 120 described with respect to FIG. 1. For instance, the network device 110 can enable the source device 102 of FIG. 1 to perform the method 200 of FIG. 2 in accordance with an embodiment described herein, and one of the destination network devices 104 can enable its respective destination device 104 of FIG. 1 to perform the method 300 of FIG. 3 in accordance with an embodiment described herein. Depending on the embodiment, an operation of an example method described herein may involve intervening operations not shown. Additionally, though the operations of example methods may be depicted and described in a certain order, the order in which the operations are performed may vary among embodiments, including performing certain operations in parallel.

Referring now to the method 200 of FIG. 2, at operation 202, a source network device (e.g., 110) generates a sequence of multicast data units (e.g., multicast data packets or data frames) from data to be sent to a plurality of destination network devices. According to some embodiments, each individual multicast data unit of the sequence of multicast data units comprises a multicast network address associated with the plurality of destination network devices, and a sequence number (e.g., in the header portion of the individual multicast data unit) corresponding to a position of the individual multicast data unit in the sequence of multicast data units. For example, the individual multicast data unit is defined by (or generated in accordance with) a network protocol that supports a sequence number within the header portion of a data unit, such as TCP or InfiniBand. For some embodiments, the source network device generates of the sequence of multicast data units by generating a select multicast data unit (for the sequence) such that the select multicast data unit comprises a request for response from any destination network device that receives the select multicast data unit. For example, the select multicast data unit can be generated to include a request for acknowledgement. For example, during generation of the select multicast data unit, the source network device can determine whether the select multicast data unit is to comprise the request for response based on a periodic interval number (e.g., predetermined interval between sequence numbers) and a select sequence number of the select multicast data unit and, in response to determining that the select multicast data unit is to comprise the request for response, the source network device can generate the select multicast data unit such that the select multicast data unit comprises the request for response.

At operation 204, the source network device sends the sequence of multicast data units to the plurality of destination network devices by sending a single copy of a select multicast data unit to an intermediate network device over a network connection established between the source network device and the intermediate network device. According to some embodiments, the intermediate network device is operatively coupled between the source network device and the plurality of destination network devices, and the intermediate network device is configured to forward the single copy of the select multicast data unit toward the plurality of destination network devices. In this way, the intermediate network device can operate as a forwarding network device.

After the source network device sends the single copy of the select multicast data unit to an intermediate network device, the source network device (e.g., 110) monitors response data units received from one or more of the plurality of destination network devices at operation 206. For instance, the source network device can be configured to receive data units from various network devices and detect for when any of those received data units is a response data unit from one of the plurality of destination network devices. According to some embodiments, each response data unit from a responding destination network device comprises an indication of all multicast data units that the responding destination network device has received since the previous response. For example, the indication can comprise a specific sequence number corresponding to a last multicast data unit of all multicast data units received by the responding destination network node thus far without a gap in the received sequence. From operation 206, the method 200 can proceed to operation 208 or operation 214. For instance, the method 200 can proceed to operation 208 in response to receiving one or more responses, and the method 200 can proceed to operation 214 in response to not receiving a response.

For some embodiments, the plurality of destination network devices comprises a known number of network devices (known by the source network device) and, at operation 208, the source network device (e.g., 110) determines whether a number of response data units to the select multicast data unit received from one or more of the plurality of destination network devices is less than the known number of network devices. For some embodiments, the source network device expects response data units to be received from all of the plurality of destination network devices within a certain period of time after the source network device sends the single copy of the select multicast data unit (at operation 204). The certain period of time can be predetermined, and can be regarded as a time value after which excessive time has passed. Accordingly, the source network device of some embodiments performs operation 208 after that certain time period has passed and, in doing so, effectively determines whether all of the expected response data units have been received by the source network device.

In response to determining that the number of response data units received is not less than the known number of network devices (e.g., the number of response data units received matches the known number), at operation 210, the source network device (e.g., 110) updates a state (on the source network device) of multicast data units successfully sent thus far. For instance, the source network device can receive a response data unit from a select destination network device and the source network node can update the state to indicate that data units including and prior to the sequence number specified in the response data units have been successfully received by the select destination network node. The source network device can determine the known number of network devices (in the plurality of destination network devices) using variety of methods, including based on interactions the source network device has had with the plurality of destination network devices prior to sending of multicast data units (e.g., determining during a multicast registration process between the source network device and the destination network devices).

In response to determining that the number of response data units received is less than the known number of network devices, at operation 212, the source network device (e.g., 110) resends multicast data units from the sequence of multicast data units to the plurality of destination network devices, where the resend starts from a position in the sequence that corresponds to a specific sequence number that corresponds to a last time response data units was received from all of the plurality of destination network devices in response to a specific multicast data unit, and where the specific multicast data unit comprises the specific sequence number and a request for response (e.g., request for acknowledgement). As described herein, while the resending of multicast data units can result in some of the destination network devices receiving multicast data units for a second time, such destination network devices can each regard those second-time multicast data units as being redundant multicast data units and ignore or discard (e.g., drop) such redundant data units.

At operation 214, the source network device (e.g., 110) receives a negative acknowledgement data unit from a select destination network device of the plurality of destination network devices, where the negative acknowledgement data unit comprises a specific sequence number. The select destination network device can detect a missing multicast data unit from multicast data units the destination network node has already received based on sequences numbers of those multicast data units, or the select destination network device can detect that the select destination network device has not received a further data unit after a certain period of time. In response the select destination network device can generate and send the negative acknowledgement data unit to the source network device, where it can be associated with the missing data unit or the further data unit the selected destination unit was expecting.

In response to receiving the negative acknowledgement data unit, at operation 216, the source network device (e.g., 110) resends multicast data units from the sequence of multicast data units to the plurality of destination network devices, where the resending starts from a position in the sequence that corresponds to or relative to (e.g., before or after) the specific sequence number.

Though not illustrated in FIG. 2, the method 200 can include an operation where the source network device can detect for when data unit loss rate exceeds a burst replication count of a communications network between the source network device and the plurality of destination network devices. In response to this detection, the method 200 can include another operation where the source network device can adjusts (e.g., reduces) an interval at which response data units are requested by the source network device (e.g., reduce interval at which the source network device includes the request in in multicast data units the source network device sends to the destination network devices via the intermediate network device).

Referring now to the method 300 of FIG. 3, at operation 302, a select destination network device (e.g., 120-1) of the plurality of destination network devices (e.g., 120) receives, over a network connection established between the destination network device and an intermediate network device, an individual multicast data unit originally sent by a source network device. For some embodiments, the intermediate network device is operatively coupled between the source network device and the destination network device, and the destination network device is configured with a select multicast network address associated with a plurality of destination network devices (e.g., associated with a multicast group to which the destination network device is a member). Additionally, for some embodiments, the multicast network address of the received individual multicast data unit matches the select multicast network address of the individual destination network device. According to some embodiments, the individual multicast data unit comprises an individual sequence number that corresponds to a position of the individual multicast data unit in a sequence of multicast data units being sent by the source network device to the plurality of destinations network devices. From operation 302, the method 300 can proceed to operation 304.

At operation 304, the select destination network device (e.g., 120-1) determines whether the individual multicast data unit comprises a request for response (e.g., request for acknowledgement). In response to determining that the individual multicast data unit does not comprise the request for response, the method 300 can proceed to operation 308. In response to determining that the individual multicast data unit comprises the request for response, at operation 306, the select destination network device (e.g., 120-1) sends, to the intermediate network device, a response data unit that indicates a largest sequence number from all multicast data units received by the destination network device thus far without a sequence gap (e.g., gap in sequence numbers received). After operation 306, the method 300 proceeds to operation 308.

At operation 308, the select destination network device (e.g., 120-1) determines whether the individual sequence number of the individual multicast data unit matches a particular sequence number of a prior multicast data unit already received by the destination network device. In doing so, the select destination network device can determine (e.g., detect) whether the select destination network device has received a redundant multicast data unit (e.g., one that the source network device resent in response to receiving sufficient response data units from the destination network devices). In response to determining that the individual sequence number does not match the particular sequence number, the method 300 proceeds to operation 312. In response to determining that the individual sequence number matches the particular sequence number, at operation 310, the select destination network device (e.g., 120-1) either ignores or discards the individual multicast data unit. Where the select destination network device (e.g., 120-1) determines that the individual sequence number does not match the particular sequence number, this could mean that the individual multicast data unit is needed by the select destination network device (e.g., 120-1), and the select destination network device (e.g., 120-1) can accept the individual multicast data unit.

At operation 312, the select destination network device (e.g., 120-1) detects a missing multicast data unit from a plurality of multicast data units the destination network device has already received based on sequences numbers of the plurality of multicast data units, or the select destination network device detects the select destination network device has not received further multicast data unit within a period of time (e.g., after an excessive amount of time). In response to the detecting the missing multicast data unit or a lack of a further multicast data unit at operation 314, the select destination network device (e.g., 120-1) sends, to the intermediate network device over the network connection, a negative acknowledgement data unit that comprises a particular sequence number associated with the missing data unit or the further multicast data unit that was expected in the period of time.

Figure 4:
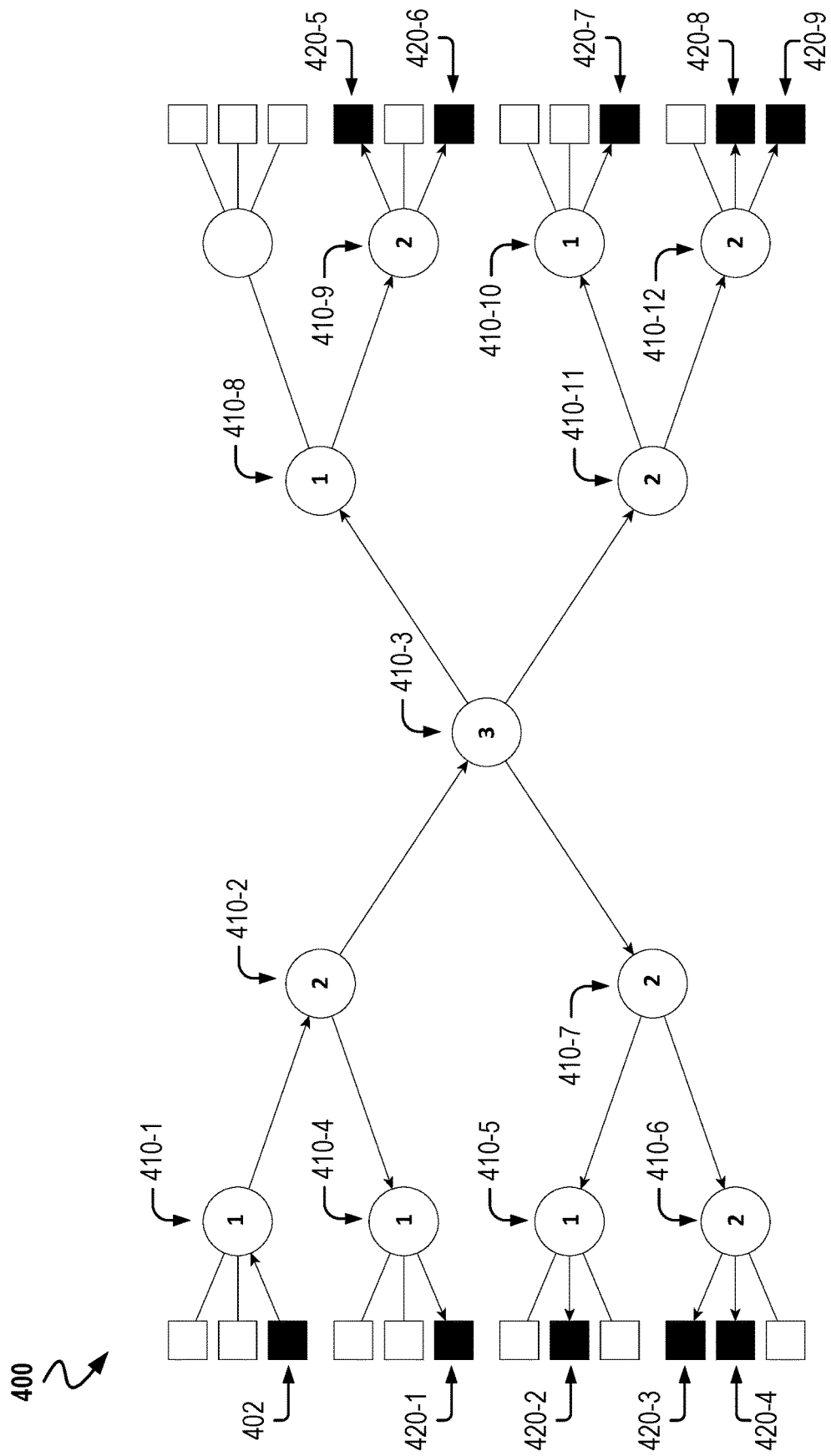
FIG. 4 is a diagram illustrating an example of communications network that includes a source network node, intermediate network nodes, and destination network nodes operating in accordance with some embodiments.

FIG. 4 is a diagram illustrating an example of communications network 400 that includes a source network node 402, intermediate network nodes 410-1 through 410-12, and destination network nodes 420-1 through 420-9 operating in accordance with some embodiments. The source network node 402 generates and sends multicast data units, using network connections, to the destination network nodes 420-1 through 420-9 through the intermediate network nodes 410-1 through 410-12. According to some embodiments, the source network node 402 sends a sequence of multicast data units to the destination network nodes 420-1 through 420-9 by sending a single copy of each individual multicast data unit to the destination network nodes 420-1 through 420-9 via the intermediate network node 410-1, and the intermediate network node 410-1 and the other the intermediate network nodes 410-2 through 410-9 generate copies as needed (e.g., one for each network connection used) to forward the individual multicast data units toward one of the destination network nodes 420-1 through 420-9. In FIG. 4, the number shown in each of the intermediate network nodes 410-1 through 410-9 indicates the number of copies of each individual multicast data unit the respective intermediate network node is expected to generate in order to facilitate forwarding of the individual multicast data to each network segment that is coupled to the intermediate network node and that includes at least one of the destination network nodes 420-1 through 420-9. As shown, a single source multicast data unit is delivered to nine endpoints, no intermediate network node in the communication network 400 is expected to transmit more than three copies, and no network connection between network nodes ever carries more than one copy of the source multicast data unit.

Figure 5:
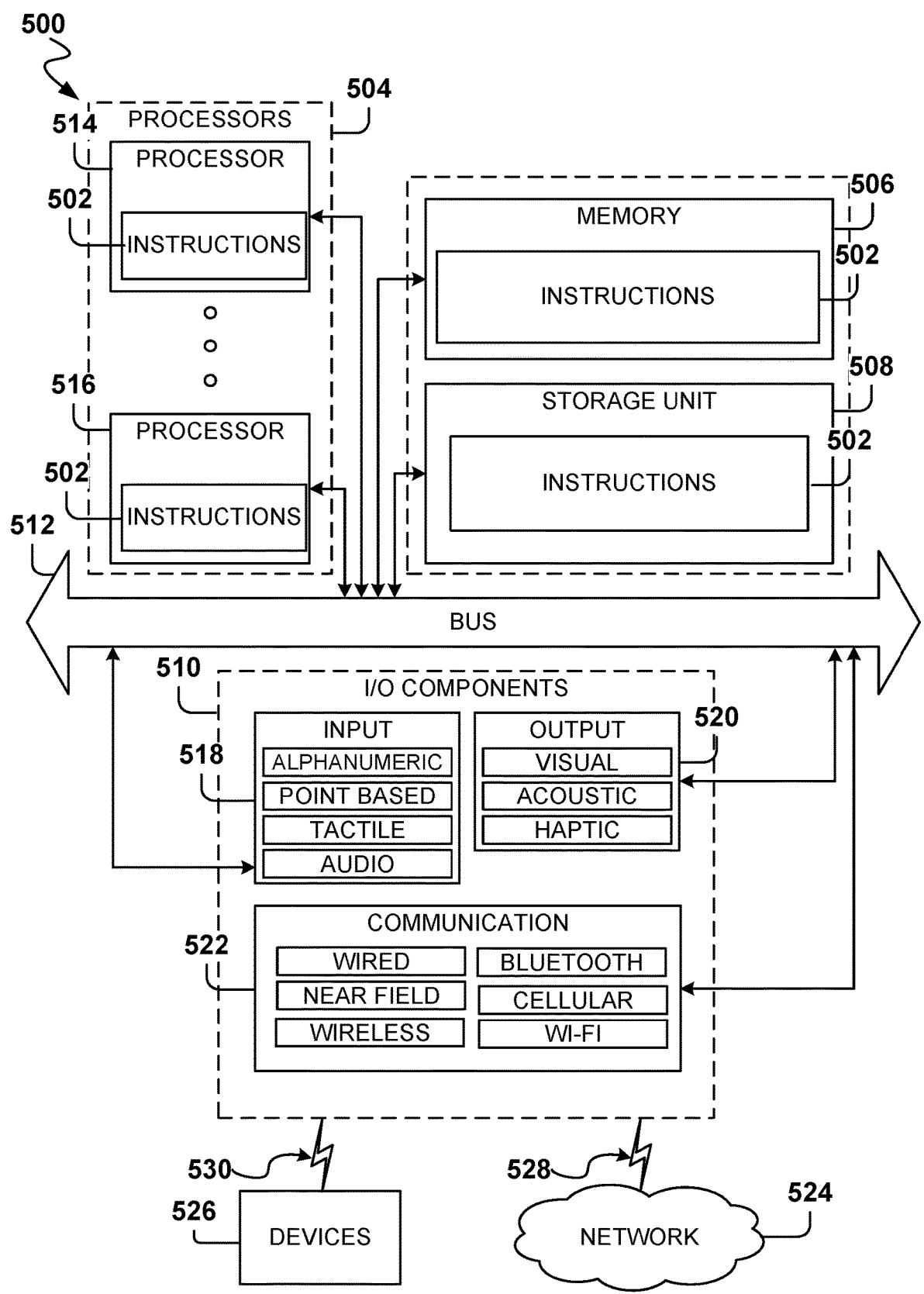
FIG. 5 is a block diagram illustrating components of an example machine that can use one or more embodiments discussed herein.

FIG. 5 is a block diagram illustrating components of an example machine 500 that can use one or more embodiments discussed herein. Specifically, FIG. 5 shows a diagrammatic representation of the machine 500 in the example form of a system, within which instructions 502 (e.g., software, a program, an application, an applet, an app, a driver, or other executable code) for causing the machine 500 to perform one or more operations that may make use of one or more of the methodologies discussed herein. For example, the instructions 502 include executable code that causes the machine 500 to execute one or more operations that cause a network device of the machine 500 (e.g., embodied by communication components 522) to perform the method 200 or 300. The machine 500 may be coupled (e.g., networked) to other machines. Depending on the embodiment, the machine 500 can implement at least some portion of one of the source device 102 or the destination devices 104.

By way of non-limiting example, the machine 500 may comprise or correspond to a television, a computer (e.g., a server computer, a client computer, a personal computer (PC), a tablet computer, a laptop computer, or a netbook), a personal digital assistant (PDA), a smart phone, a mobile device, or any machine capable of executing the instructions 502, sequentially or otherwise, that specify actions to be taken by the machine 500. Further, while only a single machine 500 is illustrated, the term "machine" shall also be taken to include a collection of machines 500 that individually or jointly execute the instructions 502.

The machine 500 may include processors 504, memory 506, a storage unit 508, and I/O components 510, which may be configured to communicate with each other such as via a bus 512. In some embodiments, the processors 504 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 514 and a processor 516 that may execute the instructions 502. The term "processor" is intended to include multi-core processors 504 that may comprise two or more independent processors (sometimes referred to as "cores") that may execute instructions 502 contemporaneously. Although FIG. 5 shows multiple processors 504, the machine 500 may include a single processor with a single core, a single processor with multiple cores (e.g., a multi-core processor), multiple processors with a single core, multiple processors with multiple cores, or any combination thereof.

The memory 506 (e.g., a main memory or other memory storage) and the storage unit 508 are both accessible to the processors 504 such as via the bus 512. The memory 506 and the storage unit 508 store the instructions 502. The instructions 502 may also reside, completely or partially, within the memory 506, within the storage unit 508, within at least one of the processors 504 (e.g., within the processor's cache memory), or any suitable combination thereof, during execution thereof by the machine 500. Accordingly, the memory 506, the storage unit 508, and the memory of the processors 504 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 502. The term "machine-readable medium" shall also be taken to include any medium, or combination of multiple media, that is capable of storing instructions (e.g., instructions 502) for execution by a machine (e.g., machine 500), such that the instructions, when executed by one or more processors of the machine (e.g., processors 504), cause the machine to perform one or more operations that makes use of one or more of the methodologies described herein (e.g., the method 300, 400 or 500). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 510 may include a wide variety of components to receive input, provide output, produce output, transmit information, exchange information, capture measurements, and so on. The specific I/O components 510 that are included in a particular machine 500 will depend on the type of the machine 500. For example, portable machines such as mobile phones will likely include a touch input device or other such input mechanisms, while a headless server machine will likely not include such a touch input device. It will be appreciated that the I/O components 510 may include many other components that are not specifically shown in FIG. 5. The I/O components 510 are grouped according to functionality merely for simplifying the following discussion and the grouping is in no way limiting. In various embodiments, the I/O components 510 may include input components 518 and output components 520. The input components 518 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components, and the like. The output components 520 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 510 may include communication components 522 operable to couple the machine 500 to a network 524 or devices 526 via a coupling 528 and a coupling 530 respectively. For example, the communication components 522 may include a network interface component or another suitable device to interface with the network 524. In further examples, the communication components 522 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 526 may be another machine or any of a wide variety of peripheral devices. According to various embodiments, the communication components 522 can include a transceiver described herein, a receiver described herein, or both.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A source network device that performs operations comprising:
    generating a sequence of multicast data units from data to be sent to a plurality of destination network devices, each individual multicast data unit of the sequence of multicast data units comprising:
        a multicast network address associated with the plurality of destination network devices; and
        a sequence number corresponding to a position of the individual multicast data unit in the sequence of multicast data units, the generating of the sequence of multicast data units comprising:
            determining whether a select multicast data unit is to comprise a request for response based on a periodic interval number and a select sequence number of the select multicast data unit; and
            in response to determining that the select multicast data unit is to comprise the request for response, generating the select multicast data unit such that the select multicast data unit comprises a request for response from any destination network device that receives the select multicast data unit; and
    sending the sequence of multicast data units to the plurality of destination network devices by sending a single copy of the select multicast data unit to an intermediate network device over a network connection established between the source network device and the intermediate network device, the intermediate network device being operatively coupled between the source network device and the plurality of destination network devices, the intermediate network device being configured to forward the single copy of the select multicast data unit toward the plurality of destination network devices.

2. The source network device of claim 1, wherein each individual multicast data unit of the sequence of multicast data units is defined in accordance with a network protocol that supports sequence numbers in data units.

3. The source network device of claim 1, wherein the generating of the sequence of multicast data units comprises:
    generating the select multicast data unit such that the select multicast data unit comprises a request for response from any destination network device that receives the select multicast data unit.

4. The source network device of claim 3, wherein the operations comprise:
   after the sending of the single copy of the select multicast data unit to the intermediate network device, monitoring for response data units received from one or more of the plurality of destination network devices, each response data unit from a responding destination network device comprising an indication of all multicast data units that the responding destination network device has received since a previous response.

5. The source network device of claim 4, wherein the indication comprises a specific sequence number corresponding to a last multicast data unit up to which all multicast data units were successfully received by the responding destination network device.

6. The source network device of claim 4, wherein the plurality of destination network devices comprises a known number of network devices, and wherein the operations comprise:
   after a certain period of time that follows the sending of the single copy, determining whether a number of response data units to the select multicast data unit received from one or more of the plurality of destination network devices is less than the known number of network devices; and
   in response to determining that the number of response data units is less than the known number of network devices, resending multicast data units from the sequence of multicast data units to the plurality of destination network devices, the resending starting from a specific sequence number that corresponds to a last time response data units were received from all of the plurality of destination network devices in response to a specific multicast data unit, the specific multicast data unit comprising the specific sequence number and a request for response.

7. The source network device of claim 6, wherein the operations comprise:
   determining the known number of network devices in the plurality of destination network devices.

8. The source network device of claim 1, wherein the operations comprise:
   after the sending of the single copy of the select multicast data unit to the intermediate network device, monitoring for response data units received from one or more of the plurality of destination network devices, each response data unit from a responding destination network device comprising an indication of all multicast data units that the responding destination network device has received thus far;
   receiving a negative acknowledgement data unit from a select destination network device of the plurality of destination network devices, the negative acknowledgement data unit comprising a specific sequence number; and
   in response to receiving the negative acknowledgement data unit, resending multicast data units from the sequence of multicast data units to the plurality of destination network devices, the resending starting from the specific sequence number.

9. The source network device of claim 1, wherein the operations comprise:
   detecting for when data unit loss rate exceeds a burst replication count of a communications network between the source network device and the plurality of destination network devices; and
   in response to detecting when data unit loss rate exceeds the burst replication count, adjusting an interval at which response data units are requested by the source network device.

10. A destination network device that performs operations comprising:
    receiving, over a network connection established between the destination network device and an intermediate network device, an individual multicast data unit originally sent by a source network device, the intermediate network device being operatively coupled between the source network device and the destination network device, the destination network device being configured with a select multicast network address associated with a plurality of destination network devices, a multicast network address of the individual multicast data unit matching the select multicast network address, the individual multicast data unit comprising an individual sequence number that corresponds to a position of the individual multicast data unit in a sequence of multicast data units being sent by the source network device to the plurality of destinations network devices;
    determining whether the individual multicast data unit comprises a request for response;
    in response to determining that the individual multicast data unit comprises the request for response, sending, to the intermediate network device over the network connection, a response data unit that indicates a largest sequence number from all multicast data units received by the destination network device thus far without a sequence gap;
    detecting a missing multicast data unit from a plurality of multicast data units the destination network device has already received based on sequences numbers of the plurality of multicast data units; and
    in response to the detecting of the missing multicast data unit, sending, to the intermediate network device over the network connection, a negative acknowledgement data unit that comprises a particular sequence number associated with the missing data unit.

11. The destination network device of claim 10, wherein the operations comprise:
    determining whether the individual sequence number of the individual multicast data unit matches a particular sequence number of a prior multicast data unit already received by the destination network device; and
    in response to determining that the individual sequence number matches the particular sequence number, ignoring or discarding the individual multicast data unit.

12. The destination network device of claim 10, wherein the particular sequence number corresponds to a particular multicast data unit that precedes the missing multicast data unit.

13. A method for a source network device, the method comprising:
    generating, by the source network device, a sequence of multicast data units, from data to be sent to a plurality of destination network devices, each individual multicast data unit of the sequence of multicast data units comprising:
    a multicast network address associated with the plurality of destination network devices; and
    a sequence number corresponding to a position of the individual multicast data unit in the sequence of multicast data units, the generating of the sequence of multicast data units comprising:

determining that a select multicast data unit is to comprise a request for response based on a periodic interval number and a select sequence number of the select multicast data unit; and in response to determining that the select multicast data unit is to comprise the request for response, generating the select multicast data unit such that the select multicast data unit comprises a request for response from any destination network device that receives the select multicast data unit; and sending, by the source network device, the sequence of multicast data units to the plurality of destination network devices by sending, to the plurality of destination network devices, a single copy of the select multicast data unit to an intermediate network device over a network connection established between the source network device and the intermediate network device, the intermediate network device being operatively coupled between the source network device and the plurality of destination network devices, the intermediate network device being configured to forward the single copy of the select multicast data unit toward the plurality of destination network devices.

14. The method of claim 13, wherein the generating of the sequence of multicast data units comprises:

generating the select multicast data unit such that the select multicast data unit comprises a request for response from any destination network device that receives the select multicast data unit.

15. The method of claim 14, comprising:

after the sending of the single copy of the select multicast data unit to the intermediate network device, monitoring, by the source network device, for response data units received from one or more of the plurality of destination network devices, each response data unit comprising an indication of all multicast data units that a responding destination network device has received thus far.

16. The method of claim 15, wherein the plurality of destination network devices comprises a known number of network devices, and wherein the operations comprise:

after a certain period of time that follows the sending of the single copy, determining, by the source network device, that a number of response data units to the select multicast data unit received from one or more of the plurality of destination network devices is less than the known number of network devices; and in response to determining that the number of response data units is less than the known number of network devices, resending, by the source network device, to multicast data units from the sequence of multicast data units to the plurality of destination network devices, the resending starting from a specific sequence number that corresponds to a last time response data units was received from all of the plurality of destination network devices in response to a specific multicast data unit, the specific multicast data unit comprising the specific sequence number and a request for response.

17. The method of claim 16, comprising:

determining, by the source network device, the known number of network devices in the plurality of destination network devices.

18. The method of claim 13, comprising:

after the sending of the single copy of the select multicast data unit to the intermediate network device, monitoring, by the source network device, for response data units received from one or more of the plurality of destination network devices, each response data unit from a responding destination network device comprising an indication of all multicast data units that the responding destination network device has received thus far;

receiving, by the source network device, a negative acknowledgement data unit from a select destination network device of the plurality of destination network devices, the negative acknowledgement data unit comprising a specific sequence number; and in response to receiving the negative acknowledgement data unit, resending, by the source network device, multicast data units from the sequence of multicast data units to the plurality of destination network devices, the resending starting from the specific sequence number.

19. The method of claim 13, comprising:

detecting, by the source network device, for when data unit loss rate exceeds a burst replication count of a communications network between the source network device and the plurality of destination network devices; and in response to detecting when data unit loss rate exceeds the burst replication count, adjusting an interval at which response data units are requested by the source network device.

20. A method for a destination network device, the method comprising:

receiving at a destination network device, over a network connection established between the destination network device and an intermediate network device, an individual multicast data unit originally sent by a source network device, the intermediate network device being operatively coupled between the source network device and the destination network device, the destination network device being configured with a select multicast network address associated with a plurality of destination network devices, a multicast network address of the individual multicast data unit matching the select multicast network address, the individual multicast data unit comprising an individual sequence number that corresponds to a position of the individual multicast data unit in a sequence of multicast data units being sent by the source network device to the plurality of destinations network devices;

determining, by the destination network device, that the individual multicast data unit comprises a request for response;

in response to determining that the individual multicast data unit comprises the request for response, sending, from the destination network device to the intermediate network device over the network connection, a response data unit that indicates a largest sequence number from all multicast data units received by the destination network device thus far without a sequence gap;

detecting, by the destination network device, a missing multicast data unit from a plurality of multicast data units the destination network device has already received based on sequences numbers of the plurality of multicast data units; and in response to the detecting of the missing multicast data unit, sending, from the destination network device to the intermediate network device over the network connection, a negative acknowledgement data unit that comprises a particular sequence number associated with the missing data unit.

* * * * *